United States Patent [19]
Kipphan et al.

[11] Patent Number: 5,509,314
[45] Date of Patent: Apr. 23, 1996

[54] TORQUE-MEASURING ARRANGEMENT IN A GEAR DRIVE FOR TRANSMITTING A ROTARY MOVEMENT

[75] Inventors: Helmut Kipphan, Schwetzingen; Tessmann Uwe, Nussloch, both of Germany

[73] Assignee: Heidelberger Druckmaschinen AG, Heidelberg, Germany

[21] Appl. No.: 313,296

[22] PCT Filed: Feb. 19, 1993

[86] PCT No.: PCT/EP93/00396

§ 371 Date: Dec. 5, 1994

§ 102(e) Date: Dec. 5, 1994

[87] PCT Pub. No.: WO93/20420

PCT Pub. Date: Oct. 14, 1993

[30] Foreign Application Priority Data

Apr. 2, 1992 [DE] Germany .............. 42 10 990

[51] Int. Cl.$^6$ ...................................... G01L 5/16
[52] U.S. Cl. .................. 73/862.06; 73/862.191
[58] Field of Search ............ 73/862.06, 862.191, 73/862.328, 862.31

[56] References Cited

U.S. PATENT DOCUMENTS 3,224,262 12/1965 Shipley .
4,089,216 5/1978 Elias .
4,188,821 2/1980 Elias .
5,058,438 10/1991 Timtner .

FOREIGN PATENT DOCUMENTS 2530602 1/1977 Germany .
8422283 11/1984 Germany .
6283630 5/1987 Japan .

OTHER PUBLICATIONS

Patent Abstracts of Japan No. 6150029 (Naoyiki) Mar. 12, 1986.
Patent Abstracts of Japan vol. No. 16193 May 11, 1992.
Application No. JP900133320 (Sanyo) May 22, 1990.

*Primary Examiner*—Richard Chilcot
*Assistant Examiner*—Elizabeth L. Dougherty
*Attorney, Agent, or Firm*—Herbert L. Lerner; Laurence A. Greenberg

[57] ABSTRACT

The purpose of the invention is to develop a torque measuring device with measuring points only at one place on the measuring shaft and which is highly sensitive in a given rotation speed range. According to the invention, in a torque measuring arrangement for a gear drive with at least three meshing helically toothed spur pinions, at least one fixed distance sensor on at least one of the pinions is directed towards a plane surface of the pinion which is connected to an evaluation device. The invention is applicable to all gear drives which transfer the power via helical gears.

5 Claims, 3 Drawing Sheets

TORQUE-MEASURING ARRANGEMENT IN A GEAR DRIVE FOR TRANSMITTING A ROTARY MOVEMENT

BACKGROUND OF THE INVENTION

1. Field of the Invention

The invention relates to a torque-measuring arrangement of a gear drive for transmitting a rotary movement and the power of which is transmitted via helically toothed spur gears.

Known torque-measuring arrangements comprise a measuring shaft provided in the gear train of a gear drive for the transmission of power. Two transducers measuring the torsion angle of the measuring shaft are assigned to said measuring shaft at a defined axial distance, said torsion angle being proportional to the torque to be measured.

In the DE-OS 28 15 463 A1 and in the patent publications DE 31 12 714 C1, FR 1 596 833 and GB 644 234 two respective measuring gears are mounted on the measuring shaft at the above-mentioned distance; in addition to measuring purposes, said gears may be used for the transmission of power. When passing a sensor, the teeth of the measuring gears initiate electrical pulses the respective torque-dependent phase shifting of which is determined in an evaluation device.

The patent publication DD 257 488 also describes an arrangement operating according to the differential-angle principle, an arrangement in which a respective rotary encoder is connected to each shaft end in order to determine the torsion angle of a drive shaft.

Disadvantageous with these solutions is that the sensors directed onto the teeth of the measuring gears require additional mounting space in radial direction, and that the torque-dependent phase shifting is determined as a function of speed, which increases the efforts in the evaluation device, and that the sensitivity and accuracy of the measuring arrangement depends from the number and the pitch accuracy of the measuring gears or may be improved by means of a measuring shaft being of little torsional stiffness, which is limited by the power to be transmitted and the thus increased tendency to vibrate.

Further known torque-measuring devices operate with force-measuring devices, in particular strain gauges, which are are provided in a measuring bearing or directly in the toothing of the power-transmitting drive gear (DE 25 26 582 C2). Said devices have the disadvantage that the stiffness of such measuring bearings is smaller than that of conventional bearings requiring the same mounting space. Furthermore, the stiffness of the frames receiving the measuring bearings is reduced as a result of the larger mounting space needed for the measuring bearings so that, in general, the integration of measuring bearings brings about disadvantageous changes with respect to the dynamic gearing properties.

SUMMARY OF THE INVENTION

It is the object of the invention to develop a torque-measuring device making it possible to directly measure the torque transmitted in a gear train and ensuring a great degree of stiffness of the bearings and the drive elements.

According to the invention the object is achieved in that in a torque-measuring arrangement for a drive gear having at least three meshing helically toothed spur gear there is at least one distance sensor fixed on the frame and provided on at least one of said gears and directed onto a plane surface of said gear, said distance sensor being connected to an evaluation device.

The invention makes it possible to determine the torque by measuring the deformations of a shaft or a gearwheel. Due to the helical toothing of the spur gears forces acting towards the rotary axis of the measuring gearwheel occur on the circumference of said spur gears, in addition to tangential forces. Said axial forces cause the shaft and the gearwheel to bend. By measuring the bending the evaluation device may determine the torque.

It is advantageous to provide a highly sensitive measuring arrangement with two pairs of distance sensors, each pair of sensors being disposed on a diameter, below the root diameter, in a plane extending perpendicular to the rotary axis of the measuring gearwheel.

Thus, wobbling errors of the measuring gearwheel can be eliminated by in-phase correction of the signals of the pairs of distance sensors in the evaluation device by the measured variables determined in the load-free condition.

In view of obtaining optimal measuring results from the deformation of gearwheel and shaft it is advantageous to dispose a first pair of distance sensors on a straight line running perpendicular to the parallel axes of the helically toothed spur gears and through the points of intersection of the axes of the measuring gearwheel and the respective neighbouring gearwheel in said plane.

The second pair of distance sensors is to be provided on a straight line also extending perpendicular to the parallel axes and through the points of intersection of the axis of the measuring gearwheel in said plane, and forming an axis of symmetry with respect to the first pair.

Another possibility of increasing the sensitivity results from the fact that, diametrically with respect to the measuring gearwheel being in an equivalent position, further distance sensors also being connected to the evaluation device are assigned to each distance sensor.

In view of a power control inside the gearing it is advantageous to connect the evaluation circuit to a control system of a multi-motor drive.

A specimen embodiment of the invention is to be explained in greater detail with reference to the drawing.

DESCRIPTION OF THE PREFERRED EMBODIMENT

In order to control the power to be transmitted by a gear drive it may be necessary to measure the torque. In particular with machines sub-aggregates of which are driven by several motors via a gear drive, it may be necessary to measure the torque transmitted in the gear drive at at least one appropriate location of the gearing in order to achieve an optimal power distribution between the motors.

Figure 1:
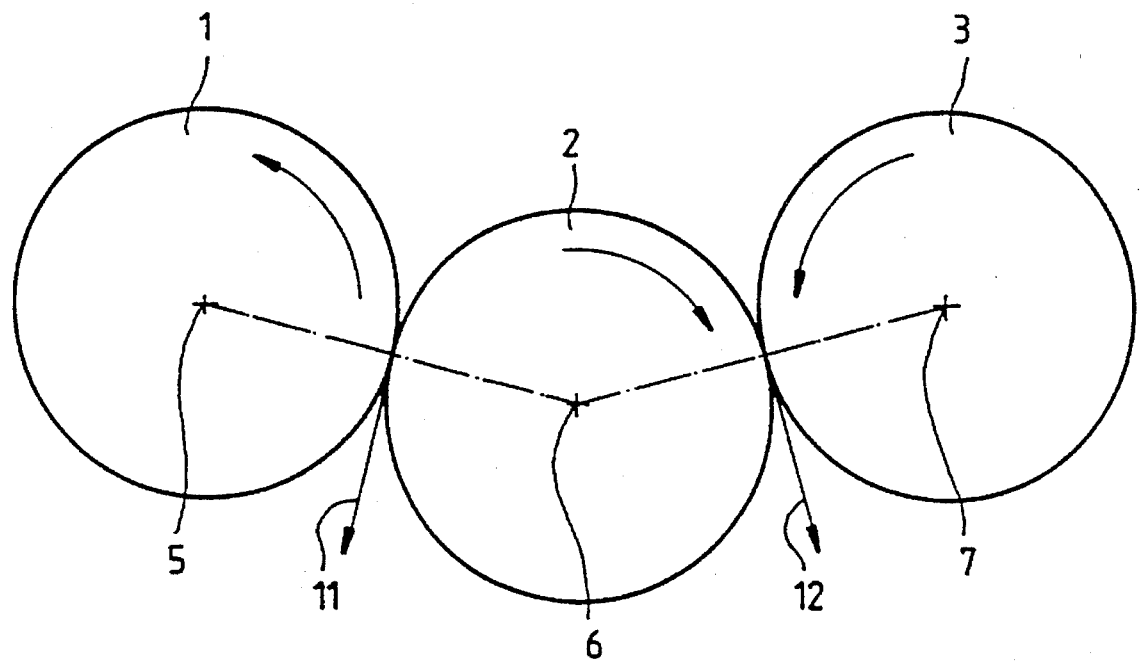
FIG. 1 shows a diagram of forces occurring on helically toothed spur gears.
Figure 1:
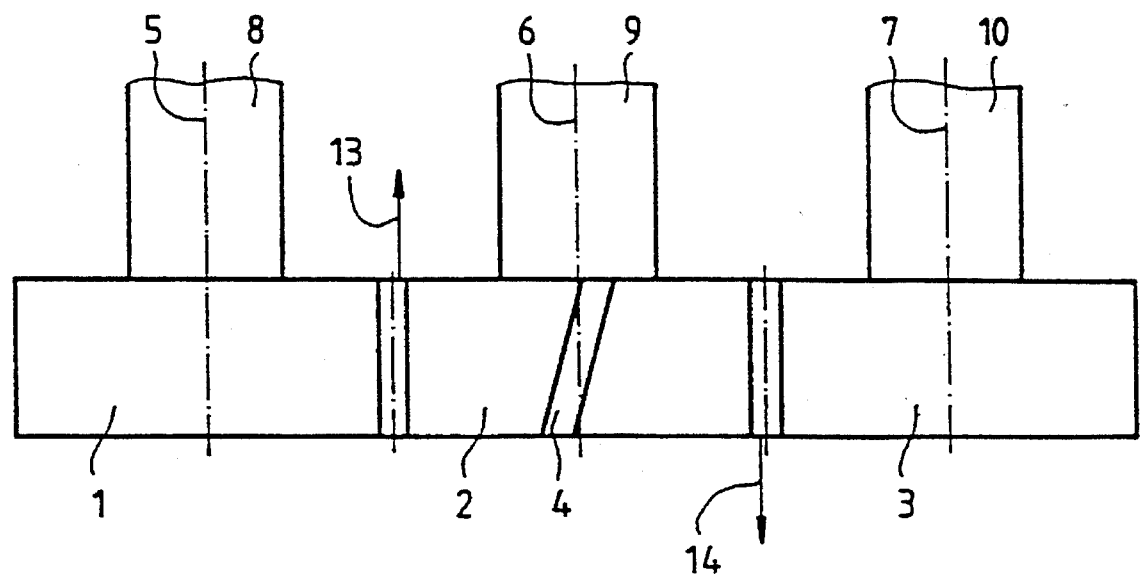

FIG. 1 shows a side elevational view and a top view of three gearwheels 1, 2, 3 featuring helical teeth 4. The axes 5, 6, 7 of the shafts 8, 9, 10 run parallel to each other and are disposed at a fixed distance with respect to each other. Transmitting power via the gearwheels 1, 2, 3 causes tangential forces 11 and 12 and forces 13 and 14 resulting from the helical toothing and acting towards the axes 5, 6, 7. The inventive measuring arrangement is based on the fact that the elastic deformations caused by the forces 13 and 14 and existing on the shafts 8, 9, 10 and the gearwheels 1, 2, 3 are measured.

Figure 2:
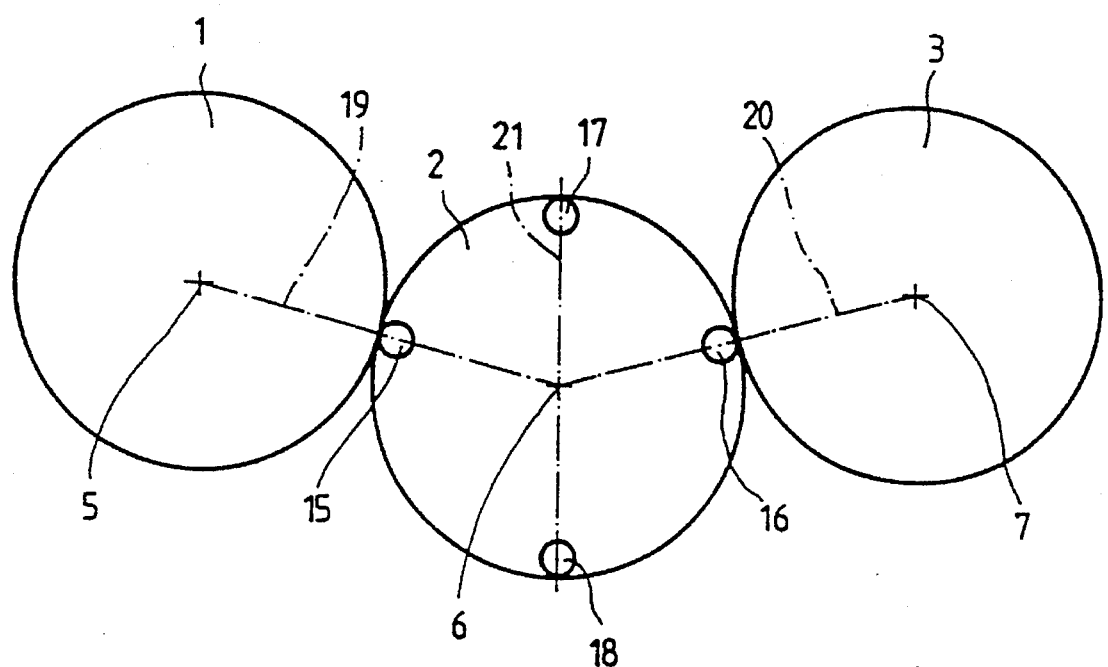
FIG. 2 is a diagram showing the arrangement of distance sensors.
Figure 3:
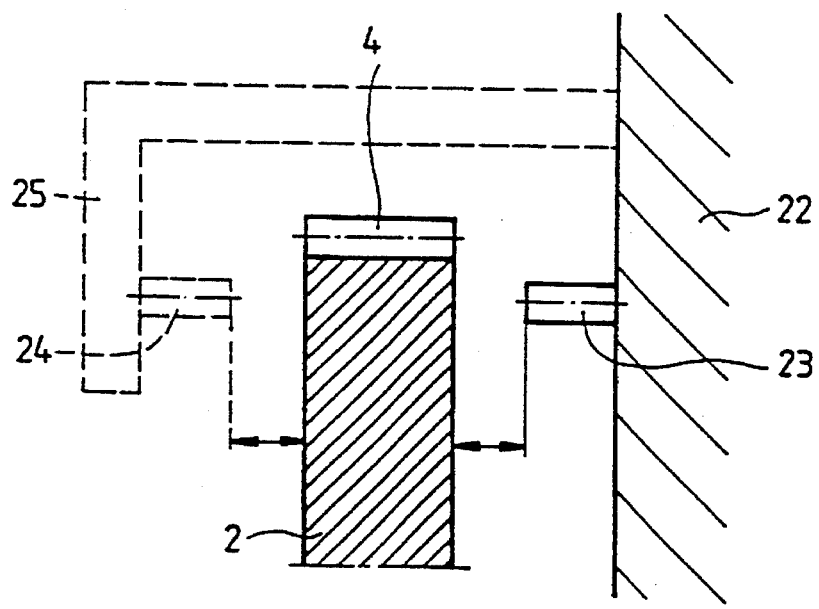
FIG. 3 shows an arrangement of sensors for the purpose of increasing the sensitivity.

For this purpose two pairs of distance sensors 15, 16 and 17, 18 are directed onto the plane surface of gearwheel 2 serving as a measuring gear, as can be seen in FIG. 2. A side elevational view shows the first pair of distance sensors 15, 16 on a connecting line 19, 20 connecting the points of intersection of the axes 5, 6 and 6, 7 of the gearwheels 1, 2 and 2, 3 respecitvely in the proximity of the root diameter of the gearwheel 2. The second pair of distance sensors 15, 16 lies on an axis of symmetry 21 with respect to a first pair of distance sensors 15, 16. In order to increase the sensitivity it is possible to assign a further distance sensor 24, provided opposite the gearwheel 2, to each distance sensor stationarily fixed in a frame 22, said distance sensor 24 being also stationarily fixed in a mounting 25 which, in turn, is firmly connected to the frame 22. The distance sensors 15, 16 detect the deformation of the gearwheel 2 and the distance sensors 17, 18 detect the bending of the shaft 9.

Figure 4:
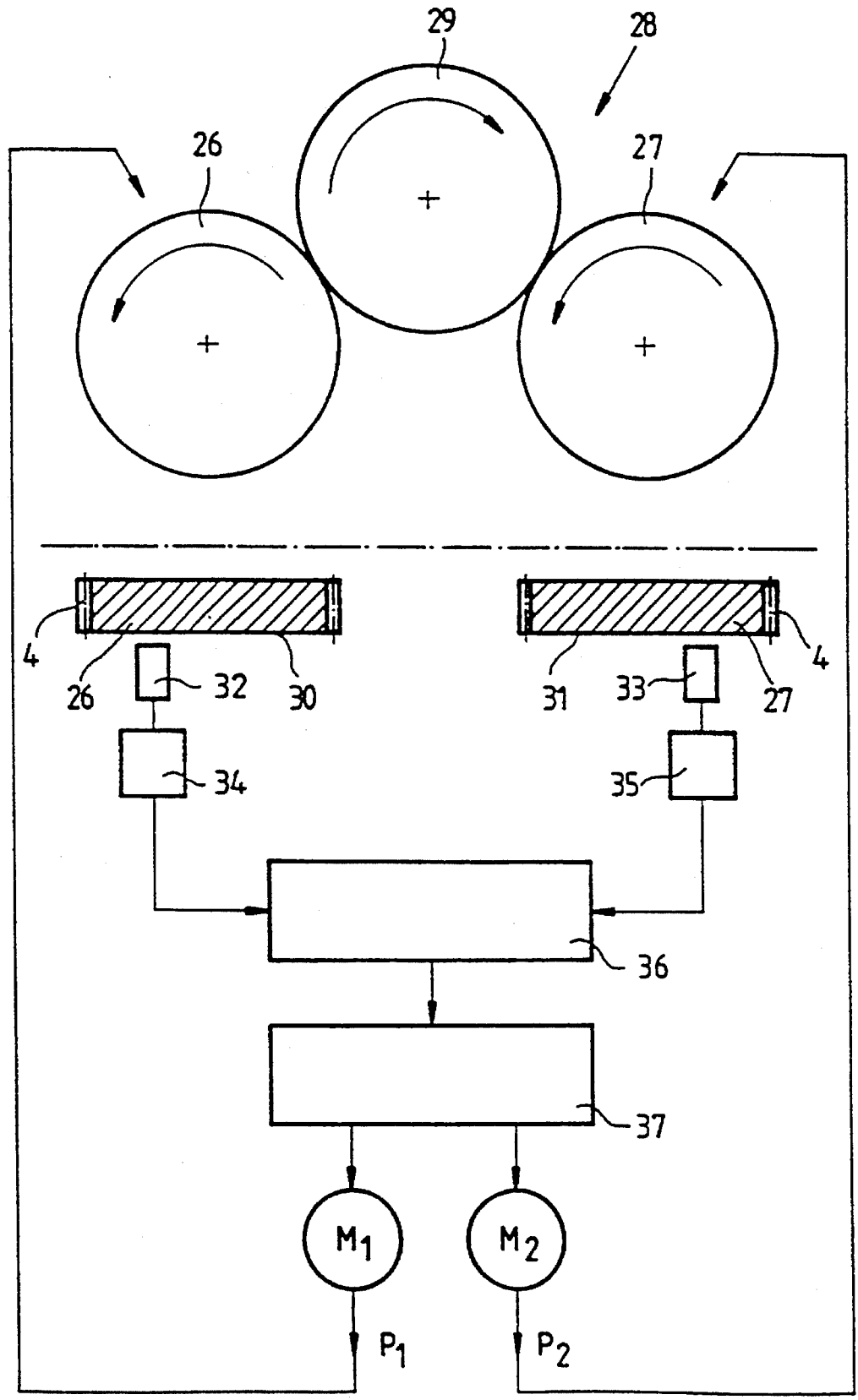
FIG. 4 is a diagram showing the signal processing inside a multi-motor drive.

FIG. 4 shows a signal-processing diagram of a multi-motor drive comprising two inventive measuring arrangements. According to said diagram the gearwheels 26, 27 feed the power $P_1$ and $P_2$ produced by the motors $M_1$ and $M_2$, via the shafts, to the gear drive 28 including the helical intermediate gearwheel 29. Respective distance sensors 32, 33 connected, via oscillators 34, 35, to an evaluation device 36 are directed onto the plane surfaces 30, 31 of the gearwheels 26, 27. The evaluation device 36 is followed by a control system 37 which is connected to the motors $M_1$ and $M_2$. As distance sensors 32, 33 any preferably contactless sensors of high precision and high resolution such as, for example, inductive transducers, eddy-current transducers or laser-triangulation sensors. A calibration is necessary in order to determine absolute torque values can be used. Wobbling errors of the gearwheels 1, 2, 3 and 26, 27 which result from geometric deviations and would falsify the measurement may be eliminated from the distance sensors 15, 16, 17, 18 and 30, 32 inside the evaluation circuit 36 by in-phase subtraction of the values measured. When disposing two or more distance sensors 15, 16, 17, 18 and 30, 32 directed onto the plane surface of a gearwheel 1, 2, 3 and 26, 27 the sensitivity of the measuring arrangement can be increased by linking the respective individual plus/minus measuring signals and by appropriate wiring two opposite sensors 23, 24.

With long-term measurements the measuring arrangement may be reset by taking measurements at standstill of a loadless gear with the measuring gearwheel 2 and 26, 27 being in any known angle-of-rotation position, thus ensuring absolute-value measurements of long-term stability. The signals—available at the output of the evaluation circuit 36—for the torque are fed to an input of the control system 37 which controls the power produced by the motors $M_1$ and $M_2$ as a function of the amount and direction of the torque.

We claim:

1. An assembly for measuring a torque in a gear wheel drive, comprising:

three mutually meshing, helically toothed spur gears rotatably mounted about respective, mutually parallel axes;

at least one of said spur gears having a planar surface perpendicular to said axes;

a distance sensor stationarily disposed and directed towards said planar surface of said at least one spur gear; and an evaluation unit connected to said distance sensor for determining a distance between said distance sensor and said planar surface.

2. The assembly according to claim 1, wherein said distance sensor is one of two pairs of distance sensors disposed in a plane oriented perpendicularly to said axes of said spur gears.

3. The assembly according to claim 1, wherein said two pairs of distance sensors are first and second pairs of distance sensors, said distance sensors of said first pair being disposed along a straight line oriented perpendicularly to said parallel axes and intersection said parallel axes of mutually adjacent ones of said spur gears, and said second pair of distance sensors being disposed along a diameter of said one spur gear and symmetrically between said two sensors of said second pair.

4. The assembly according to claim 1, wherein said at least one spur gear has another planar surface opposite said planar surface, and including two pairs of further distance sensors connected to said evaluation unit and facing said other planar surface at locations opposite from said distance sensors.

5. The assembly according to claim 1, including a control system and a multi-motor drive, said evaluation unit being connected to said control system.

* * * * *